United States Patent
Greiner et al.

(10) Patent No.: US 10,254,450 B1
(45) Date of Patent: Apr. 9, 2019

(54) SURFACE ACCURACY OF A THIN OPTICAL COMPONENT

(75) Inventors: Christoph M. Greiner, Eugene, OR (US); Thomas W. Mossberg, Eugene, OR (US); Dmitri Iazikov, Eugene, OR (US)

(73) Assignee: LIGHTSMYTH TECHNOLOGIES INC., Eugene, OR (US)

( * ) Notice: Subject to any disclaimer, the term of this patent is extended or adjusted under 35 U.S.C. 154(b) by 295 days.

(21) Appl. No.: 13/445,859

(22) Filed: Apr. 12, 2012

Related U.S. Application Data

(60) Provisional application No. 61/474,731, filed on Apr. 12, 2011.

(51) Int. Cl.
*G02B 5/18* (2006.01)
*G02B 27/42* (2006.01)

(52) U.S. Cl.
CPC .............. *G02B 5/18* (2013.01); *G02B 27/42* (2013.01)

(58) Field of Classification Search
CPC ........ G02B 27/44; G02B 27/46; G02B 27/42; G02B 5/18; G02B 5/1814; G11B 7/1353; B32B 3/02; B32B 17/00; B29C 65/00
USPC ...... 359/566, 563, 565; 428/64.1, 64.2, 410; 156/99, 103, 104, 106
See application file for complete search history.

(56) References Cited

U.S. PATENT DOCUMENTS 4,038,014 A * 7/1977 Dusza et al. ................... 425/388
2009/0180185 A1* 7/2009 Hayashi ......................... 359/566

* cited by examiner

*Primary Examiner* — Jie Lei
(74) *Attorney, Agent, or Firm* — David S. Alavi

(57) ABSTRACT

A method for improving surface accuracy of an optical component comprises: positioning a first surface of the optical component against a reference surface of a reference member; urging together the reference member and the optical component; adhering a second surface of the optical component to a first surface of a support member; and separating the reference member from the optical component while leaving the optical component adhered to the support member. Urging together the reference member and the optical component substantially conforms the surface accuracy of the first surface of the optical component to the surface accuracy of the reference surface of the reference member. Adhering the optical component to the support member and then separating the reference member from the optical component leaves the surface accuracy of the first surface of the optical component substantially in conformance with the surface accuracy of the first surface of the reference member.

55 Claims, 6 Drawing Sheets

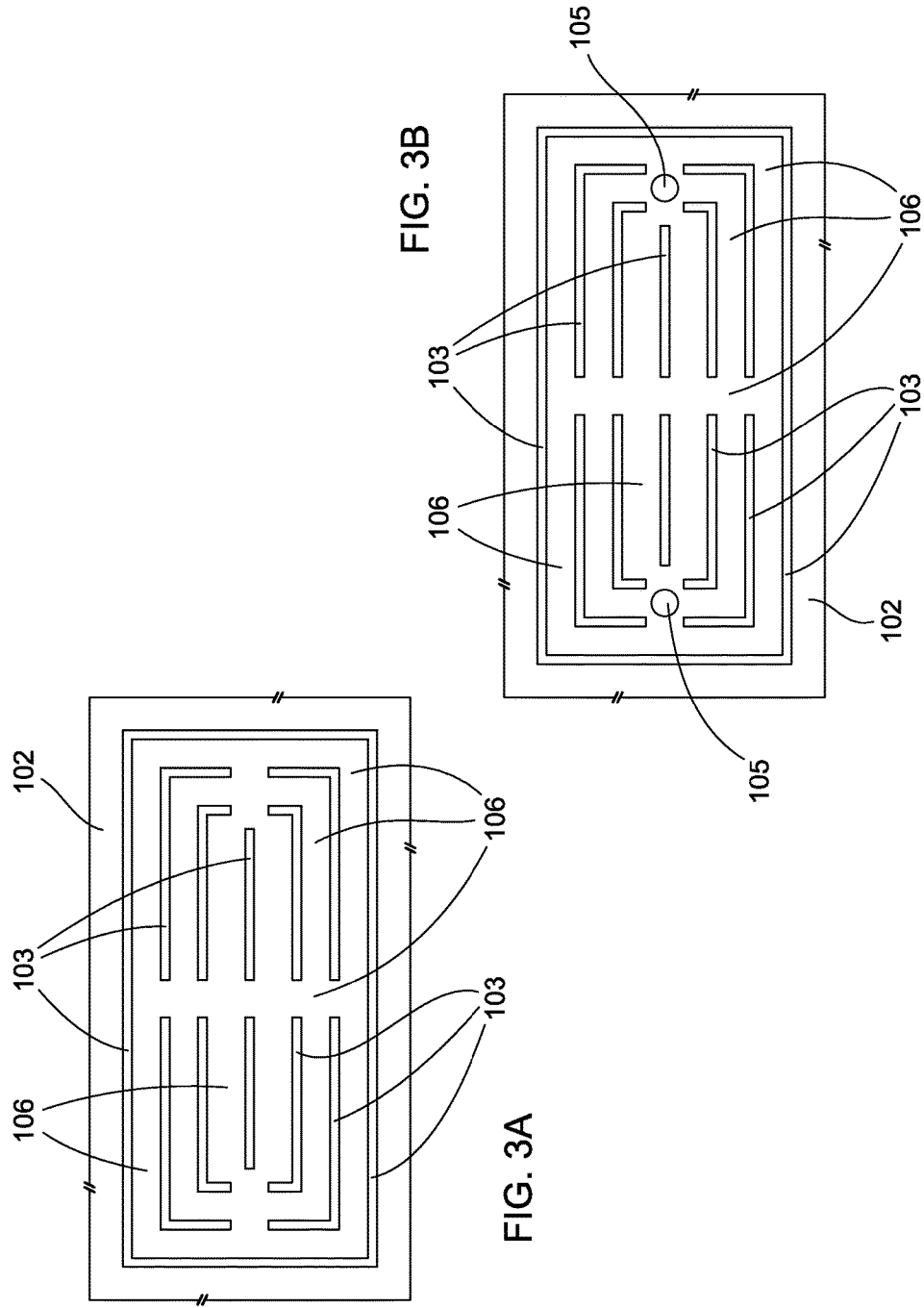

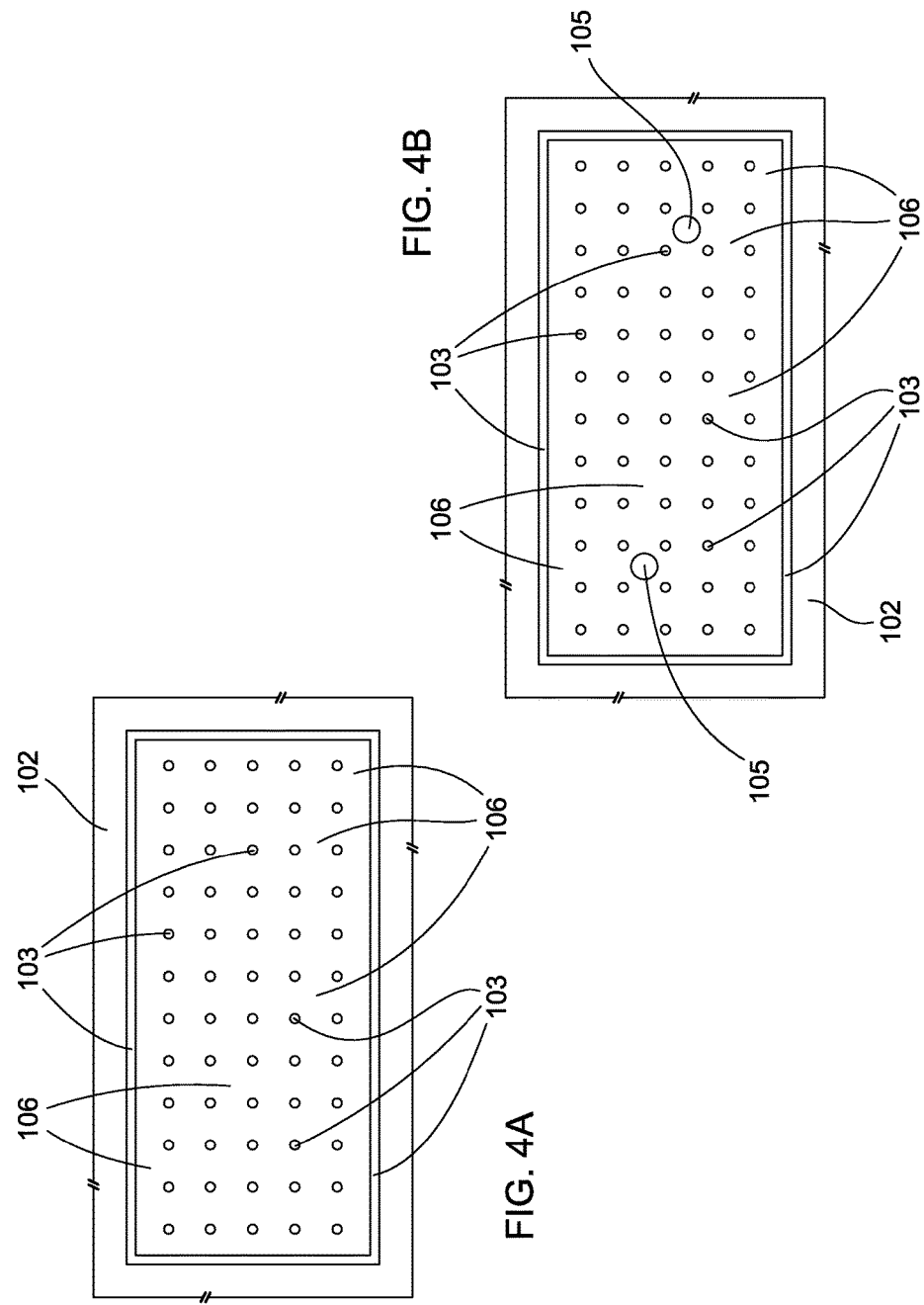

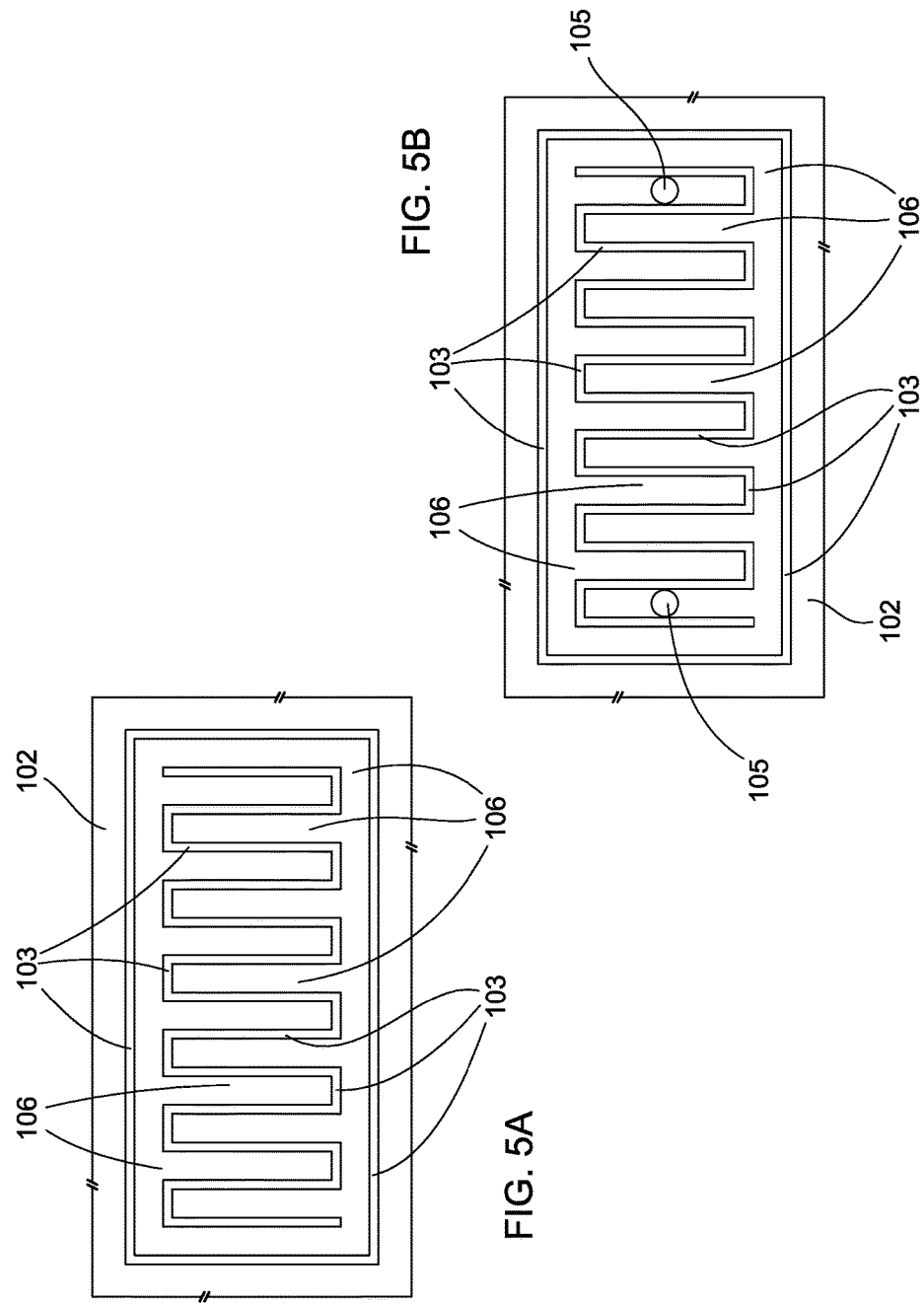

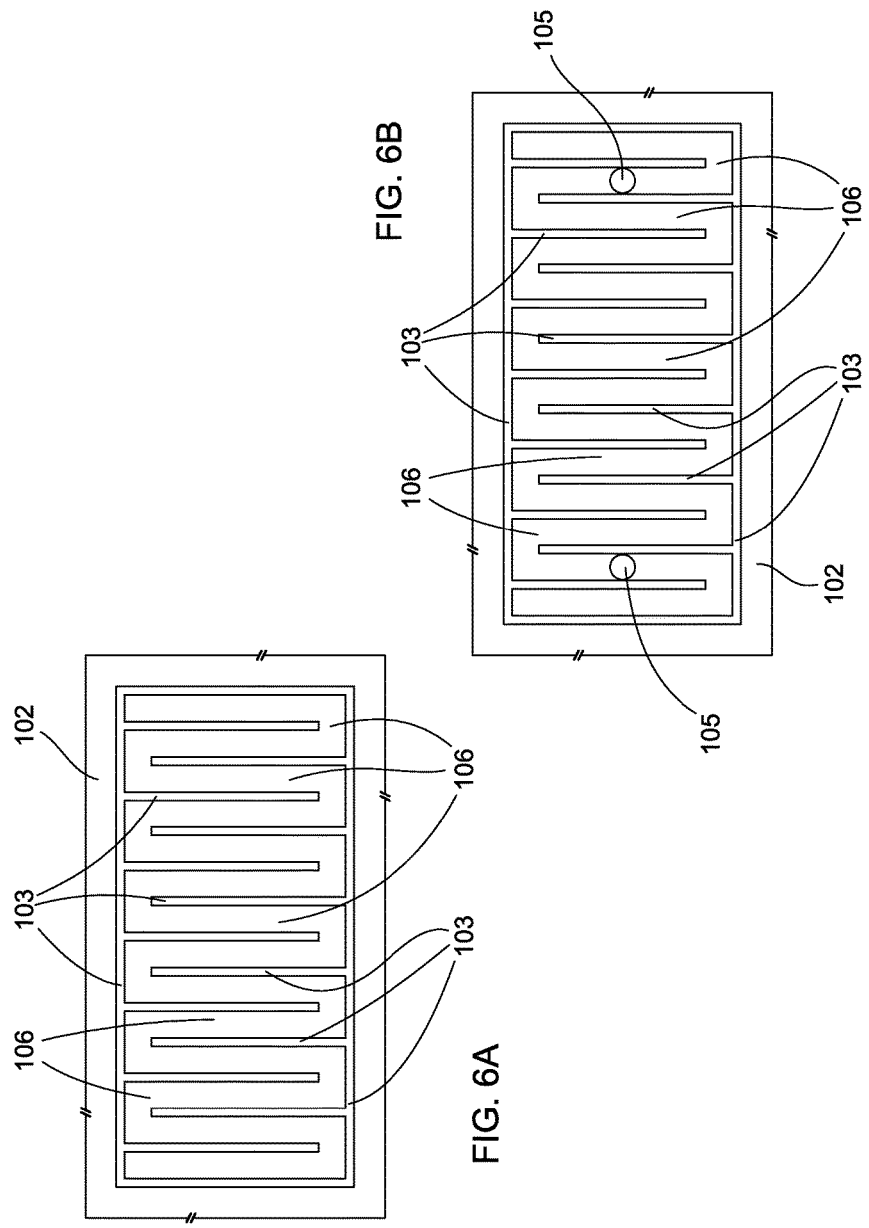

SURFACE ACCURACY OF A THIN OPTICAL COMPONENT

BENEFIT CLAIMS TO RELATED APPLICATIONS

This application claims benefit of U.S. provisional App. No. 61/474,731 entitled "Reduced surface area vacuum chucks for flattening thin optical components" filed Apr. 12, 2011 in the names of Christoph M. Greiner, Thomas W. Mossberg, and Dmitri lazikov, said provisional application being hereby incorporated by reference as if fully set forth herein.

BACKGROUND

The field of the present invention relates to optical components. In particular, improved surface accuracy of a thin optical component is described herein.

The surface flatness of a transmissive or reflective optical component (or more precisely, the surface accuracy of a nominally flat optical component) is an important parameter in optics. For purposes of the present disclosure and appended claims, surface accuracy is defined as the maximum deviation of a surface of an optical component from its idealized nominal surface shape, whether that nominal shape is flat, spherical, spheroidal, ellipsoidal, paraboloidal, hyperboloidal, cylindrical (including circular, elliptical, parabolic, or hyperbolic), or other suitable or desirable shape. Surface accuracy is typically reported as a fractional wavelength (e.g., $\lambda/4$ or $\lambda/10$), because it is often measured relative to interference fringes produced by nearly monochromatic light, e.g., from an atomic lamp or a laser. Surface accuracy reported in that way only has meaning relative to the wavelength used to characterize the surface; 632.8 nm light from a HeNe laser is often used, but any suitable wavelength can be employed. Alternatively, surface accuracy can be expressed as an absolute deviation (e.g., 100 nm or 200 nm).

Surface accuracy should be distinguished from surface roughness or surface quality. Roughly speaking, surface accuracy characterizes the component over longer distances than surface quality or roughness. Surface accuracy mostly affects how a propagating optical signal deviates from its designed behavior after interacting with the component, due to, e.g., wavefront distortion induced by the component. Surface quality or roughness mainly manifests itself as optical loss or scatter from the component. Methods and articles disclosed herein primarily address the issue of surface accuracy of a relatively thin optical component. Wavefront distortion due to inadequate surface accuracy can cause undesirable system performance issues. For example, efficiently coupling an optical signal into a single mode optical fiber requires a near-diffraction-limited wavefront, so as to enable the optical signal to be focused to an aberration-free focal spot that closely matches the mode properties of the fiber. Wavefront distortion induced by a non-ideal optical component can lead to undesirably or unacceptably large insertion loss penalties arising from mismatch between the resulting aberrated focused beam and the fiber mode.

It is often the case that, to maintain a needed or desired degree of surface accuracy, a typical optical component comprises a relatively thick substrate that has sufficient rigidity to resist bending, bowing, or warping during fabrication and use. Such bending, bowing, or warping would induce deviations from the component's nominal shape, resulting in generally undesirable wavefront distortion when used. Avoiding such bending, bowing, or warping is substantially more difficult when using a relatively thin, sheet-like optical component. Examples of such thin optical components are those fabricated from silicon or quartz wafers using, e.g., spatially selective material processing techniques such as those employed in the semiconductor industry. However, such fabrication methods offer cost competitiveness and fabrication accuracy unparalleled by traditional optics manufacturing methods, so that ensuring surface accuracy of such thin components is an important goal. Tools and methods for improving surface accuracy of thin optical components, including those fabricated from wafer materials, to maintain surface accuracy of such component within operationally acceptable specifications, are needed and are disclosed or claimed herein.

SUMMARY

A method for improving surface accuracy of an optical component comprises: (a) positioning a first surface of the optical component against a reference surface of a reference member; (b) urging together the reference member and the optical component; (c) adhering a second surface of the optical component to a first surface of a support member; and (d) separating the reference member from the optical component while leaving the optical component adhered to the support member.

The first and second surfaces of the optical component are on opposite sides thereof and are separated by an optical component thickness (e.g., less than about 1 mm or 2 mm) that is less than respective widths and heights of the first and second surfaces (e.g., greater than about 5 mm or 10 mm). The nominal shape of the first surface of the optical component is a complement of the nominal shape of the reference surface of the reference member. Urging together the reference member and the optical component substantially conforms the final surface accuracy of the first surface of the optical component to the reference surface accuracy of the reference surface of the reference member (e.g., 100 nm or 200 nm). The optical component is adhered to the support member while the reference member and the optical component are urged together and the final surface accuracy of the first surface of the optical component substantially conforms to the reference surface accuracy of the first surface of the reference member. Separating the reference member from the optical component leaves the final surface accuracy of the first surface of the optical component substantially in conformance with the reference surface accuracy of the first surface of the reference member.

Objects and advantages pertaining to surface accuracy of thin optical components may become apparent upon referring to the exemplary embodiments illustrated in the drawings and disclosed in the following written description or appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 3A and 3B illustrate schematically a reference surface and recessed regions of a first exemplary reference member.

FIGS. 4A and 4B illustrate schematically a reference surface and recessed regions of a second exemplary reference member.

FIGS. 5A and 5B illustrate schematically a reference surface and recessed regions of a third exemplary reference member.

FIGS. 6A and 6B illustrate schematically a reference surface and recessed regions of a fourth exemplary reference member.

It should be noted that the embodiments depicted in this disclosure are shown only schematically, and that not all features may be shown in full detail or in proper proportion. Certain features or structures may be exaggerated relative to others for clarity. It should be noted further that the embodiments shown are exemplary only, and should not be construed as limiting the scope of the written description or appended claims.

DETAILED DESCRIPTION OF EMBODIMENTS

Figure 1:
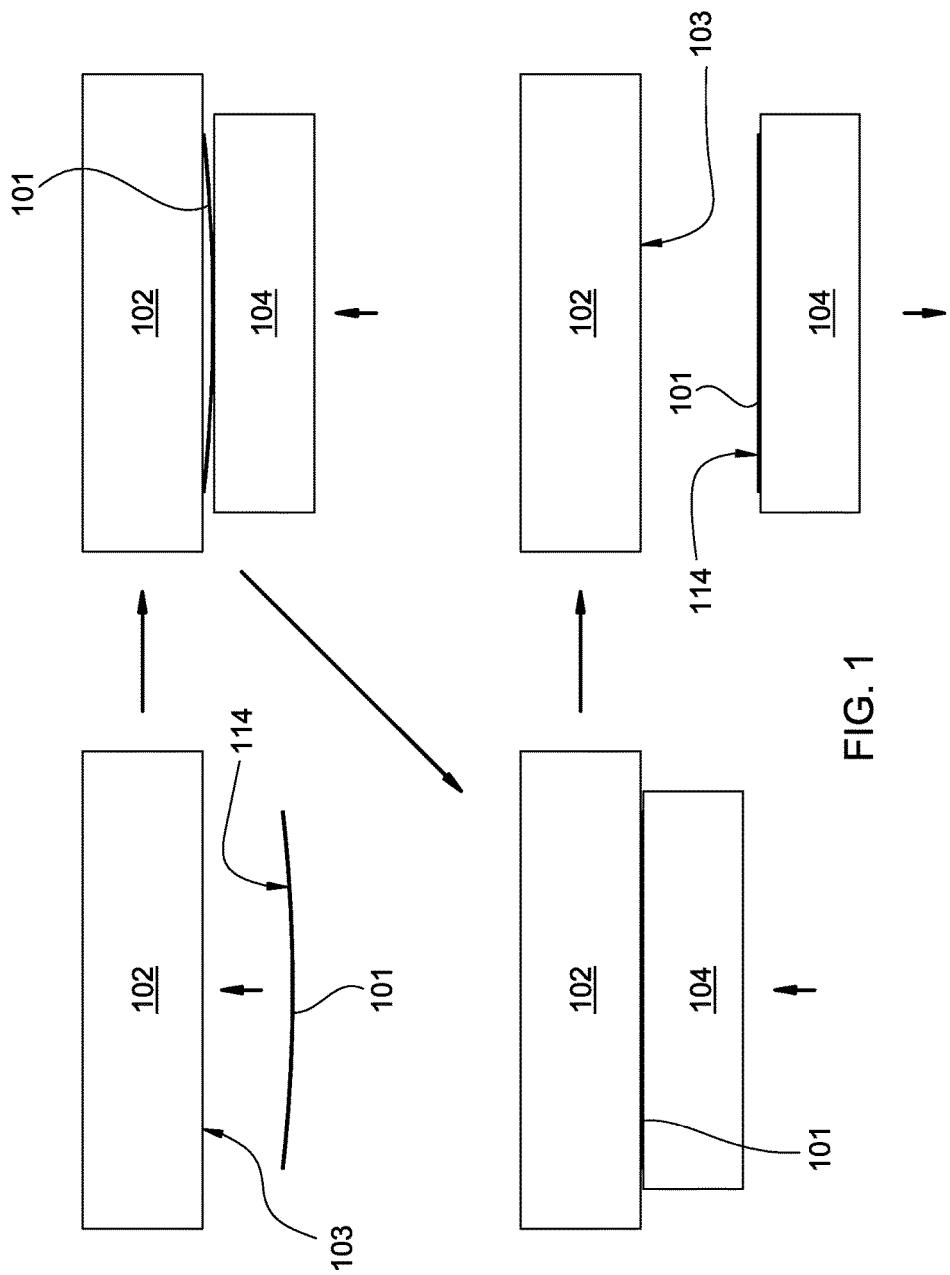
FIG. 1 illustrates schematically an exemplary process for urging a thin optical component against a reference surface by applying mechanical pressure with a supporting member.

FIG. 1 illustrates schematically a relatively thin, wafer-based, nominally flat optical component 101; exemplary dimensions of component 101 are about 0.7 mm thick, about 24 mm wide, and about 12 mm high. Note that "height" and "width" are only used as relative terms, and are not intended to denote any absolute spatial direction or orientation. Examples of optical component that can be considered "thin" in the context of the present disclosure or claims can include an optical component less than about 2 mm thick and greater than about 5 mm wide and high, or less than about 1 mm thick and greater than about 10 mm wide and high. A thicker and larger (or thinner and smaller) optical element can in some instances be regarded as "thin" if it has an aspect ratio similar to the preceding examples. In some instances, an optical component can be considered functionally "thin" if its surface accuracy can be improved using the methods or articles disclosed or claimed herein. The optical component 101 can comprise any suitable material, including but not limited to any one or more of semiconductor material, silicon, doped silicon, dielectric material, quartz, silica, doped silica, optical glass, ceramic material, or metallic material. Semiconductor materials (such as silicon) and certain dielectric materials (such as quartz or silica) that are wafer-processed may be particularly amenable to methods disclosed or claimed herein, and are often nominally flat; other nominal surface shapes can be employed as appropriate, including those mentioned in the Background. "Nominal shape" is intended to denote an idealized surface, whatever its shape (e.g., flat or curved in various ways described herein), that has no surface inaccuracy. Due to the relative thinness of optical component 101, its first surface 114 may exhibit relatively poor surface accuracy in the form of bending, bowing, or warping to yield a convex, concave, or saddle-like non-planar surface.

Reference member 102 is relatively thick (e.g., 10 mm for the current example), usually at least as high and wide as the optical component (12 mm by 24 mm in the current example), and has a nominally flat reference surface 103 in the current example. Other height, width, thickness, or nominal surface shape can be employed as appropriate, including nominal surface shapes mentioned in the Background. If non-planar nominal surface shapes are employed, those shapes of the surface 114 and the reference surface 103 are preferably complimentary so that those surfaces fit together properly as described below. Reference surface 103 is polished or otherwise formed or processed so as to exhibit a desired degree of surface accuracy (e.g., less than about $\lambda/4$ or less than about $\lambda/10$ at about 633 nm, or less than about 100 nm or less than about 200 nm; any other suitable, necessary, or desirable surface accuracy can be employed). The surface accuracy of reference surface 103 (i.e., the reference surface accuracy) is typically, but not necessarily, superior to or about the same as that exhibited by surface 114 of optical component 101 prior to performing the following method (i.e., the initial surface accuracy), and is substantially equal to that desired to be exhibited by surface 114 after the method is performed (i.e., the final surface accuracy). Reference member 102 can comprise any suitable material, including but not limited to any one or more of semiconductor material, silicon, doped silicon, dielectric material, quartz, silica, doped silica, optical glass, ceramic material, or metallic material. Silicon or fused silica are often suitable choices. The relative thickness of reference member 102 enables it to substantially resist the bending, bowing, or warping that degrades the surface accuracy of the optical component 101.

Optical component 101 and reference member 102 are positioned with at least a portion of surface 114 against at least a portion of reference surface 103. The reference member 102 and the optical component are urged together so that the final surface accuracy of the optical component 101 substantially conforms to the reference surface accuracy of reference surface 103. The relative thinness of optical component 101 and the relative thickness of reference member 103 ensures that the optical component 101 deforms and flattens against reference 103, and not vice versa.

Figure 2:
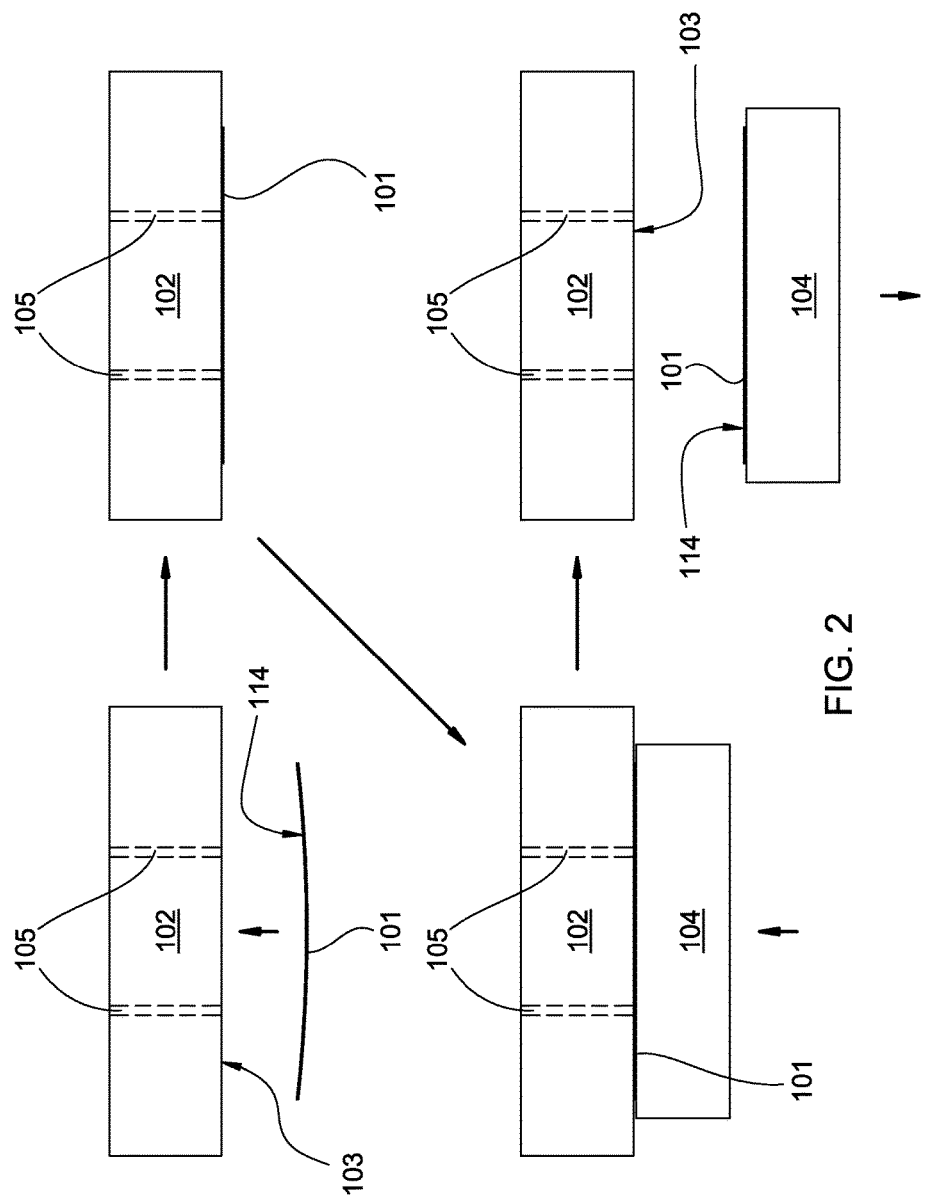
FIG. 2 illustrates schematically an exemplary process for urging a thin optical component against a reference surface by applying negative air pressure or by optical contacting.

In the example of FIG. 1, the optical component 101 is urged against the reference member 102 by application of mechanical pressure using support member 104. The surface of support member 104 is arranged to nominally conform to the nominal shape of the second surface of the optical component 101, but typically need not exhibit the same degree of surface accuracy as the reference surface 103. In the example of FIG. 2, a channel 105 through the reference member 102 enables application of negative air pressure through the channel 105 to urge the optical component against the reference surface 103. "Negative air pressure" is intended to denote any pressure differential between ambient pressure and lower pressure within the channel 105, using any suitable ambient gas, including atmospheric air. Alternatively, the example of FIG. 2 can illustrate an example in which optical contacting between the first surface 114 and the reference surface 103 urges the optical component 101 and the reference member 102 together. Optical contacting can occur even if only portions of the surface 114 and the reference surface 103 are in contact (e.g., if optical component 101 is a grating having protruding ridges and intervening trenches on surface 114, or if reference member 102 includes recessed regions as described below).

Whichever way the optical component 101 and the reference member 102 are urged together, the resulting forces deform the first surface 114 of the optical component 101 to substantially conform its surface accuracy to that of the reference surface 103. Whether or not a support member 104 is employed to apply mechanical pressure, it is positioned against the second surface of the optical component 101, which is thereby sandwiched between the support member 104 and the reference member 103. If support member 104 was not used to urge the optical component 101 against the reference surface 103, then its surface need not necessarily conform to the second surface of optical component 101, although it may be advantageous if it does; adhesive can fill areas where those surfaces do not make contact (see below). The support member 104 can comprise any suitable material, including but not limited to any one or more of semiconductor material, silicon, doped silicon, dielectric material, quartz, silica, doped silica, optical glass, ceramic material, or metallic material. It may be desirable in some instances to select a material for the support member 104 so as to match the thermal expansion coefficient of the optical component (e.g., to within $10^{-6}$); using the same material for the optical component 101 and the support member 104 is one way to ensure such matching of thermal expansion. The support member 104 is adhered to the second surface of the optical component 101 while the optical component 101 continues to be urged against the reference member 102 and its surface accuracy continues to substantially conform to that of the reference surface 103.

Adhesion between the support member 104 and the optical component 101 can be achieved in any suitable way. In some instances optical contacting can be employed. More typically an adhesive is applied between the optical component 101 and the support member 104. Any suitable adhesive can be employed, including but not limited to epoxy, acrylate, or other polymer adhesive; thermal curing or photo-curing can be employed as appropriate. The adhesive can in some instances fill in and smooth over some or all insufficient surface accuracy or excessive surface roughness that might be present on support member 104. It may be desirable in some instances to select an adhesive material so as to match the thermal expansion coefficient of the optical component 101 or the support member 104 (e.g., to within $10^{-6}$).

If the optical component 101 is to be used in transmission, then it, the support member 104, and any adhesive employed should be substantially transparent over an operational wavelength range for which the optical component 101 is to be used. In such instances, an index-matching adhesive can be advantageously employed to reduce or minimize unwanted reflections at one or both of the interfaces (component 101 to adhesive or adhesive to support member 104). Index-matching between the materials of the optical component 101 and the support member 104 can also be advantageous; using the same materials for the optical component 101 and the support member 104 is one way of achieving that. An index-matching adhesive also may be advantageous in some arrangements wherein at least a portion of the optical functionality of the optical component 101 is localized at its second surface (i.e., adjacent the adhesive).

Once the optical component 101 is adhered to the support member 104, the optical component 101 is separated from the reference surface 103. If mechanical pressure was employed, that pressure is simply released and the optical component can be removed. If negative pressure was employed, pressure equalization enables removal of the optical component 101 from the reference surface 103. If optical contacting was employed, then the optical component 101 can simply be pulled away from the reference surface 103 (assuming the force adhering the optical component to the support member 104 is sufficient to overcome the force of optical contacting between the optical component 101 and the reference surface 103; if that is not the case, then optical contacting would not be an ideal choice for urging the optical component 101 against the reference surface 103 in the first place).

Whichever way the optical component was adhered to the support member 104 and is then removed from the reference surface 103, adhesion between the second surface of the optical component 101 and the support member 104 retains the first surface 114 of the optical component thereby preventing its reversion to its initial surface accuracy, so that its final surface accuracy remains substantially in conformance with the reference surface accuracy of the reference surface 103, despite the thinness and susceptibility to undesirable deformation of the solid optical component 101. The support member 104 adhered to the second surface of the optical component 101 provides ongoing mechanical support and stability for the thin optical component 101.

In the simplest example, the reference surface 103 can comprise a single contiguous area. If negative air pressure is employed, one or more channels 105 can be formed in any suitable way (e.g., drilling) through the reference member 102 to communicate with the reference surface. However, the relatively large contact area between the reference surface 103 and the first surface 114 of the optical component renders the process extremely susceptible to contamination. Any contaminant particles between the reference surface 103 and component surface 114 can result in unwanted distortion of the component surface 114, perhaps even worse than that present before the process is performed. In addition, the presence of such contaminant particles can also damage the component surface 114 or even the reference surface 103. One way that problem can be mitigated is to employ thorough cleaning protocols for the surfaces and to perform the process only in a stringent clean-room environment.

Alternatively, the reference surface can be adapted to reduce significantly the area of contact between the reference surface 103 and the component surface 114. As illustrated schematically in the examples of FIGS. 3A-6B, the reference member 102 is provided with one or more recessed regions 106 over the same general area as the reference surface 103. A first fractional area of the component surface 114 is in contact with the reference surface 103, but a second fractional area of the component surface 114 faces the recessed regions 106. The first fractional areas can be less than about 50% of the total combined area of the reference surface 103 and the recessed regions 106, less than about 30% of that combined area, less than about 20% of that combined area, less than about 10% of that combined area, or even less than about 1% of that combined area, or whatever suitable fractional area is suitable in a given instance. Whatever fractional division is employed, the likelihood of trapping a contaminant particle between the reference surface 103 and the component surface 114 is decreased to a commensurate degree. For example, if only about 1% of the combined area is occupied by the reference surface 103, then the likelihood of trapping a contaminant particle against the reference surface 103 is only about 1% of the probability for a single large contiguous area. In that example, there is roughly a 99% probability that the contaminant particle would be harmlessly trapped in one of the recessed regions 106 instead (assuming the recessed regions 106 are sufficiently deep to receive a contaminant particle; a depth greater than about 50 about 100 or about 150 μm is sufficient in most cases; sufficient depth may depend on the nature of contaminant particles typically present; any needed, desired, or suitable depth can be employed).

The recessed regions 106 can be formed in any suitable way, including but not limited to machining (including engraving or laser machining), photolithography of any suitable type, or molding or stamping of any suitable type. If needed or desired, the reference surface 103 can be polished or otherwise processed to achieve the desired surface accuracy after the recessed regions 106 are formed. To facilitate use of negative pressure, one or more recessed regions 106 can be arranged to communicate with one or more channels 105 and to be circumscribed by an area of the reference surface 103 (as in FIGS. 3B, 4B, 5B, and 6B). If the negative pressure applied is large enough, however, the recessed region need not be the wholly circumscribed. In some examples, multiple channels 105 communicate with the reference surface 103 and are of suitable number and arrangement so that the channels 105 effectively also function as recessed regions 106. In that example, the channels 105 can also be regarded as recessed regions 106 that extend through the reference member 103, as opposed to recessed regions 106 that are blind except perhaps for relatively small communication with separate channels 105).

The purpose of the reference surface 103 is to function as a sufficiently rigid mechanical template against which the optical component 101 can be pressed and deformed so as to conform its surface accuracy to that of the reference surface 103. Recessed regions 106 can degrade that functionality if they are not suitably arranged on the reference member 102 along with the reference surface 103. A suitable arrangement can be generally characterized as one in which the largest span of the optical component 101 across a recessed region 106 is less than about 3 times the thickness of the optical component 101, or less than about 2 times the thickness of optical component 101, or less than or about equal to the thickness of optical component 101. Limiting the span of the optical element 101 across recessed regions 106 ensures that the desired surface accuracy can be imparted by the reference surface 103 to the optical component 101 despite the presence of the recessed region 106.

The "span" of the optical component 101 can be defined in a variety of ways, due mainly to the wide variety of arrangements that can be employed for the recessed regions 106 and the reference surface 103. A first suitable definition is the minimum distance from any given point on an edge of a recessed region 106 across the recessed region 106 to a point on another edge of the recessed region 106. In some examples using that first definition, if the recessed regions 106 are elongated trenches (as in FIGS. 3A/3B, 5A/5B, and 6A/6B), the span would be the width of the trench. In another example using the first definition, if a recessed region 106 surrounds an array of multiple discontiguous "islands" of the reference surface 103 (as in FIGS. 4A/4B), then the span would be the shortest distance from a point on the edge of one island to the edge of an adjacent island, or roughly equal to the island spacing for a regular array of islands. Other examples can be demonstrated using the first definition of "span."

A second suitable definition of "span" is twice the distance from any given point in a recessed region 106 to the nearest edge of the reference surface 103. In the examples of FIGS. 3A/3B, 5A/5B, and 6A/6B, every point within the trench is at most one half of the trench width away from an edge of the reference surface 103; in the example of FIGS. 4A/4B, every point between the "islands" is at most one island spacing away from an edge of the reference surface 103 (depending on the type of array); other examples can be demonstrated using the second definition of "span." A given arrangement of the reference surface 103 and the recessed regions 106 can be deemed to satisfy the "largest span is less than . . . " criterion under either or both definitions. Using either or both definitions, there may be limited areas of the recessed regions 106 that do not meet the criterion because, e.g., they lie at a trench intersection, or near an edge of the optical component, or are otherwise exceptional. As long as those exceptional areas are sufficiently small so as not to degrade the surface accuracy achieved for the optical component 101, then the recessed regions 106 and the reference surface 103 can be deemed to have satisfied the "largest span is less than . . . " criterion described above.

In a typical application of the disclosed method, at least a portion of the optical functionality of the optical component 101 is localized at the first surface 114 (i.e., the surface that is conformed to the surface accuracy of the reference surface 103. In many of those instances, the optical component functions by reflecting an optical signal incident on the first surface 114, and the surface accuracy of the second surface of the optical component 101 or the surface of the support member 104 is relatively unimportant (as long as adequate adhesion can be established and maintained). In some instances, at least a portion of the optical functionality can be localized at the second surface of the optical component 101, or the optical component functions by reflecting an optical signal from or transmitting an optical signal through its second surface that is adhered to the support member 104. In that case, the wavefront distortion imparted by the optical component 101 on the optical signal depends in part on the surface accuracy of the second surface of the optical component. That surface accuracy depends on the surface accuracy of the first surface 114 (which substantially conforms to reference surface 103) and the thickness variation of the optical component (specified as TTV for semiconductor wafers, for example; thickness variation on the order of 1-2 µm is typical for wafers used in lithography, although larger or smaller variations can be specified as needed). Surface inaccuracy of that magnitude can be difficult to overcome if the optical component operates by reflection from its second surface. If the optical component only transmits through its second surface, index matching between the optical component 101, adhesive (if any), and support member 102 can significantly mitigate surface inaccuracy of the second component surface.

Any suitable, necessary, or desired optical functionality can be imparted onto one or both surfaces of optical component 101 or within the bulk of optical component 101. Examples of elements providing optical functionality can include but are not limited to reflective coatings, anti-reflective coatings, spectrally selective coatings, diffractive structures including surface or volume gratings, lenses, birefringent structures, index gradients, and so on. The methods and articles disclosed or claimed herein may be particular suitable for enhancing surface accuracy of diffraction gratings fabricated by lithographic techniques on relatively thin wafer materials (e.g., semiconductor or dielectric materials readily available in wafer form for use in lithography; one standard nominal thickness of such wafers is 675 µm).

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., sets of features that are not incompatible or mutually exclusive) that appear in the present disclosure or the appended claims, including those sets that may not be explicitly disclosed herein. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC § 112 ¶6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112 ¶6 are not intended to be invoked for that claim.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A method for improving surface accuracy of a solid optical component, the method comprising:
   (a) positioning at least a first portion of a first surface of the solid optical component against at least a first portion of a reference surface of a reference member, wherein the optical component comprises the first surface and a second surface that are on opposite sides of the optical component and are separated by an optical component thickness that is less than respective widths and heights of the first and second surfaces, wherein a nominal shape of the first surface of the optical component is a complement of an idealized nominal shape of the reference surface of the reference member, wherein the reference surface exhibits a reference surface accuracy with respect to the idealized nominal shape of the reference surface, and wherein the first surface of the optical component exhibits an initial surface accuracy with respect to the idealized nominal shape of the reference surface;
   (b) urging together the reference member and the solid optical component, thereby deforming the solid optical component so as to cause the first portion of the first surface of the deformed, solid optical component to exhibit a final surface accuracy with respect to the idealized nominal shape of the reference surface that is smaller than the initial surface accuracy and that substantially conforms to the reference surface accuracy of the first portion of the reference surface of the reference member;
   (c) adhering at least a portion of the second surface of the deformed, solid optical component to at least a portion of a first surface of a support member while the reference member and the optical component are urged together and the final surface accuracy remains substantially in conformance with the reference surface accuracy; and
   (d) separating the reference member from the adhered, deformed, solid optical component while leaving the optical component adhered to the support member with the final surface accuracy remaining substantially in conformance with the reference surface accuracy, wherein adhesion of the deformed, solid optical component to the support member prevents reversion of the first portion of the first surface of the deformed, solid optical component from the final surface accuracy to the initial surface accuracy.

2. The method of claim 1 wherein the reference surface comprises a single contiguous area.

3. The method of claim 1 wherein:
   a first fractional area of the first surface of the deformed, solid optical component is in contact with the reference surface and a second fractional area of the first surface of the solid optical component faces one or more recessed regions of the reference member but is not in direct contact with the one or more recessed regions;
   the first fractional area is less than about half of a total area of the first surface of the optical component; and
   no portion of the second fractional area spans a distance greater than about twice the optical component thickness.

4. The method of claim 3 wherein each recessed region is greater than about 100 µm deep.

5. The method of claim 3 wherein the first fractional area is less than about 10% of the total area of the first surface of the optical component.

6. The method of claim 3 wherein the first fractional area is less than about 1% of the total area of the first surface of the optical component.

7. The method of claim 3 wherein:
   the reference member includes one or more corresponding channels that communicate at corresponding first ends thereof with at least one recessed region; and
   the optical component and the reference member are urged together by negative air pressure applied to a corresponding second end of one or more of the channels.

8. The method of claim 7 wherein the solid optical component is elastically deformable.

9. The method of claim 7 wherein the solid optical component comprises an areal segment of a lithographically processed wafer.

10. The method of claim 3 wherein the reference surface comprises multiple, discontiguous areas separated by one or more intervening recessed regions.

11. The method of claim 3 wherein the reference surface includes one or more areas that are each arranged to circumscribe at least one corresponding recessed region.

12. The method of claim 3 wherein the solid optical component is elastically deformable.

13. The method of claim 3 wherein the solid optical component comprises an areal segment of a lithographically processed wafer.

14. The method of claim 1 wherein the optical component thickness is less than about 2 mm and the first and second surfaces of the optical component are each greater than about 5 mm in height and width.

15. The method of claim 1 wherein the optical component thickness is less than about 1 mm and the first and second surfaces of the optical component are each greater than about 10 mm in height and width.

16. The method of claim 1 wherein the nominal shapes of the first surface of the optical component and the reference surface of the reference member are flat.

17. The method of claim 1 wherein the nominal shapes of the first surface of the optical component and the reference surface of the reference member are spherical, cylindrical, spheroidal, ellipsoidal, paraboloidal, or hyperboloidal.

18. The method of claim 1 wherein the surface accuracy of the reference surface is about 200 nm.

19. The method of claim 1 wherein the surface accuracy of the reference surface is about 100 nm.

20. The method of claim 1 wherein the reference member or the support member includes a semiconductor material, silicon, doped silicon, quartz, silica, doped silica, an optical glass, a ceramic material, or a metallic material.

21. The method of claim 1 wherein (i) the optical component is adhered to the support member using an adhesive and (ii) the optical component, the support member, and the adhesive exhibit corresponding thermal expansion coefficients that are within about $10^{-6}$ of one another.

22. The method of claim 1 wherein the optical component is adhered to the support member using a polymer adhesive.

23. The method of claim 1 wherein the optical component is adhered to the support member by optical contacting.

24. The method of claim 1 wherein (i) the optical component is adhered to the support member using an index-matching adhesive and (ii) the optical component, the support member, and the adhesive are substantially transparent over an operational wavelength range.

25. The method of claim 24 wherein at least a portion of optical functionality of the optical component is localized at the second surface of the optical component.

26. The method of claim 1 wherein the optical component and the reference member are urged together by mechanical pressure exerted on the reference member and the support member with the optical component therebetween.

27. The method of claim 1 wherein the reference member includes one or more channels that each communicate at a corresponding first end thereof with the reference surface, and the optical component and the reference member are urged together by negative pressure applied to a corresponding second end of each channel.

28. The method of claim 1 wherein the optical component and the reference member are urged together by optically contacting the first surface of the optical component and the reference surface.

29. The method of claim 1 wherein at least a portion of optical functionality of the optical component is localized at the first surface of the optical component.

30. The method of claim 1 wherein at least a portion of optical functionality of the optical component is localized at the second surface of the optical component.

31. The method of claim 1 wherein at least a portion of optical functionality of the optical component comprises a diffraction grating formed at the first or second surface of the optical component.

32. An article made by the method of claim 1.

33. The method of claim 1 wherein the solid optical component is elastically deformable.

34. The method of claim 1 wherein the solid optical component comprises an areal segment of a lithographically processed wafer.

35. The method of claim 1 wherein the solid optical component comprises one or more of semiconductor material, silicon, doped silicon, quartz, silica, doped silica, optical glass, ceramic material, or metallic material.

36. The method of claim 35 wherein the solid optical component and the reference member are urged together so as to deform the solid optical component without substantially altering the optical component thickness.

37. An article comprising an elastically deformable solid optical component and a support member wherein:
(a) the solid optical component comprises a first surface and a second surface that are on opposite sides of the optical component and are separated by an optical component thickness that is less than respective widths and heights of the first and second surfaces;
(b) at least a portion of the second surface of the solid optical component adheres to at least a portion of a first surface of the support member, thereby deforming the solid optical component so that at least a first portion of the first surface of the adhered, deformed, solid optical component exhibits a final surface accuracy substantially in conformance with a reference surface accuracy relative to an idealized nominal shape of a reference surface of a reference member;
(c) adhesion of the deformed, solid optical component to the support member prevents reversion of the first portion of the first surface of the adhered, deformed, solid optical component from the final surface accuracy to an initial surface accuracy, with respect to the idealized nominal shape of the reference surface, exhibited by the first portion of the first surface of the solid optical component prior to adhesion to the support member; and
(d) the initial surface accuracy is larger than the final surface accuracy.

38. The article of claim 37 wherein the optical component thickness is less than about 2 mm and the first and second surfaces of the optical component are each greater than about 5 mm in height and width.

39. The article of claim 37 wherein the optical component thickness is less than about 1 mm and the first and second surfaces of the optical component are each greater than about 10 mm in height and width.

40. The article of claim 37 wherein a nominal shape of the first surface of the optical component is flat.

41. The article of claim 37 wherein a nominal shape of the first surface of the optical component is spherical, spheroidal, cylindrical, ellipsoidal, paraboloidal, or hyperboloidal.

42. The article of claim 37 wherein the surface accuracy of the first surface of the optical component is about 200 nm while adhered to the support member.

43. The article of claim 37 wherein the surface accuracy of the first surface of the optical component is about 100 nm while adhered to the support member.

44. The article of claim 37 wherein the support member includes a semiconductor material, silicon, doped silicon, quartz, silica, doped silica, an optical glass, a ceramic material, or a metallic material.

45. The article of claim 37 wherein (i) the optical component is adhered to the support member by an adhesive and (ii) the optical component, the support member, and the adhesive exhibit corresponding thermal expansion coefficients that are within about $10^{-6}$ of one another.

46. The article of claim 37 wherein the optical component is adhered to the support member by a polymer adhesive.

47. The article of claim 37 wherein the optical component is adhered to the support member by optical contacting.

48. The article of claim 37 wherein (i) the optical component is adhered to the support member by an index-matching adhesive and (ii) the optical component, the support member, and the adhesive are substantially transparent over an operational wavelength range.

49. The article of claim 48 wherein at least a portion of optical functionality of the optical component is localized at the second surface of the optical component.

50. The article of claim 37 wherein at least a portion of optical functionality of the optical component is localized at the first surface of the optical component.

51. The article of claim 37 wherein at least a portion of optical functionality of the optical component is localized at the second surface of the optical component.

52. The article of claim 37 wherein at least a portion of optical functionality of the optical component comprises a diffraction grating formed at the first or second surface of the optical component.

53. The article of claim 37 wherein the solid optical component comprises an areal segment of a lithographically processed wafer.

54. The article of claim 37 wherein the solid optical component comprises one or more of semiconductor material, silicon, doped silicon, quartz, silica, doped silica, optical glass, ceramic material, or metallic material.

55. The article of claim 54 wherein the optical component thickness of the adhered, deformed, solid optical component is substantially equal to an optical component thickness of the solid optical component prior to adhesion to the support member.

* * * * *